May 7, 1968     L. A. NASH     3,381,496

COUPLING FOR ROTATABLE MEMBERS

Filed May 4, 1966

INVENTOR
LEONARD A. NASH

BY *R. C. Terry*

ATTORNEY

United States Patent Office 3,381,496
Patented May 7, 1968

3,381,496
COUPLING FOR ROTATABLE MEMBERS
Leonard A. Nash, Lake Forest, Ill., assignor to Teletype Corporation, Skokie, Ill., a corporation of Delaware
Filed May 4, 1966, Ser. No. 547,471
7 Claims. (Cl. 64—6)

ABSTRACT OF THE DISCLOSURE

A coupling for permitting radial separation of normally aligned shafts comprised of a circular plate attached to the end of one of the shafts and a plurality of teeth extending axially from the first plate in a circular array about the shaft and positioned a first predetermined distance from one another and a second predetermined distance from the axis of the shaft and a second circular plate attached to the end of the other of the shafts and a roller having a diameter equal to the first predetermined distance extending axially from the second plate and positioned a distance from the axis of the other of the shafts equal to the second predetermined distance.

---

This invention relates to couplings and more particularly to couplings for joining rotatable members which are from time to time moved out of alignment with each other.

In many devices it is necessary to mount certain parts so that they are movable with respect to other parts. When a shaft or other rotatable member is mounted on a movable part and is normally connected to a similar member mounted on a stationary part, a coupling must be provided which allows the rotatable members to be separated from each other and which automatically reconnects the members when the movable part is returned to its original position. When the rotatable members are moved radially with respect to each other provisions for possible misalignment of the components of the coupling must be made so that the reengagement of the rotatable members can be assured.

Accordingly, an object of this invention is to provide a coupling which automatically reconnects rotatable members which have been separated radially with respect to each other.

Another object of this invention is to provide a coupling which automatically aligns its own components when a coupling operation is performed.

In the preferred embodiment the invention is employed in a coupling which is comprised of a roller eccentrically mounted on a first rotatable member and a plurality of teeth mounted in a circle on a second rotatable member. When the two rotatable members are aligned the roller on the first member fits between two of the teeth on the second member and causes the rotatable members to rotate as a unit in either direction without slippage. When the two rotatable members are reconnected after having been radially separated the roller on the first member automatically cams itself into engagement between two of the teeth on the second member thus automatically aligning the components of the coupling and reconnecting the two rotatable members.

A more complete understanding of the invention may be had by referring to the following detailed description when taken in conjunction with the drawings wherein.

Figure 1:
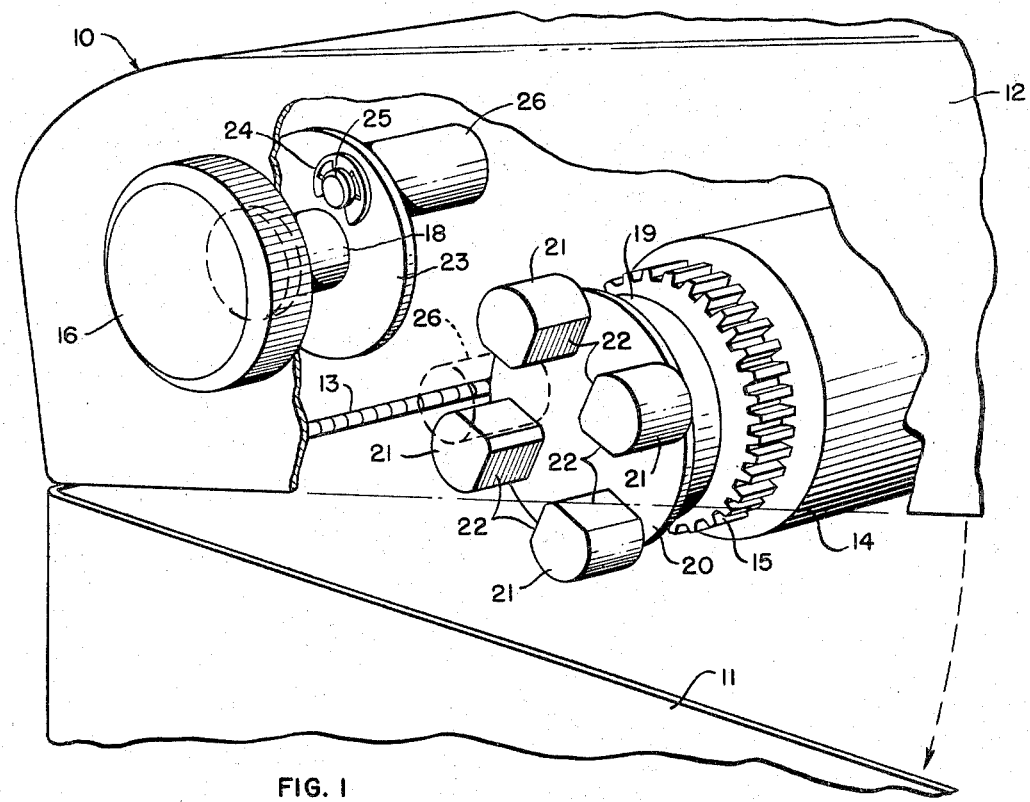
FIG. 1 is a partial perspective view of a teletypewriter employing the present invention showing the coupling of the present invention in disengaged position.

Referring now to the drawings wherein like reference numerals designate like parts throughout the several views there is shown a teletypewriter 10 having a base portion 11 and a cover 12 which is attached to the base portion 11 by means of a hinge 13. Mounted in the base portion 11 is a telegraph printer the operating instrumentalities of which are not shown except for a platen 14 and a toothed wheel 15 which is attached to the platen 14.

The platen 14 of the teletypewriter 10 is of the type which is not moved axially to effect character spacing of the copy produced by the teletypewriter 10 but which is instead employed in conjunction with the movable type carrying member (not shown) that is moved axially along the platen to effect character spacing. The platen 14 is, however, rotated about its axis to effect line spacing for the copy produced by the teletypewriter 10. Rotation of the platen 14 is caused by rotating the toothed wheel 15 by means of suitable pawls, racks, gears, etc. (not shown) which are in turn operated by any suitable line spacing mechanism.

In the teletypewriter 10 shown in the drawings the cover 12 completely encloses the operating instrumentalities of the teletypewriter 10 so as to prevent noise, vibrations etc. generated by the operating instrumentalities of the teletypewriter 10 from being detected outside of the cover 12 and the prevent dust and dirt from getting into the teletypewriter 10 and hampering its operation. Since the cover 12 completely encloses the teletypewriter 10, it is necessary to provide means for manually rotating the platen 14 from outside the cover if the raising of the cover 12 with respect to the base portion 11 each time manual positioning of the platen 14 is desired is to be dispensed with. In the device shown in the drawings a handle 16 is mounted on a shaft 17 which is in turn rotatably supported on the cover 12 by a bearing 18 that is secured to the cover 12. The cover 12 is movable on the hinge 13 with respect to the base portion 11 of the teletypewriter 10 which supports the platen 14 from a position where the axis of the handle 16 is aligned with the axis of platen 14 to a position where the axes are radially misaligned and, accordingly, it is necessary to provide a coupling between the platen 14 and the handle 16 which allows relative movement of the two components.

Attached to the toothed wheel 15 by means of a spacer 19 is a rotatable member or plate 20 which in turn supports a plurality of projections or teeth 21. The teeth 21 are mounted in a circle about the axis of platen 14 and are generally cylindrical in shape. Each of the teeth 21 has two portions of its outer surface cut away to form a pair of flat surfaces 22 on two of its sides. The teeth 21 are positioned on the plate 20 such that each of the flat surfaces 22 is spaced a predetermined distance from a mating flat surface 22 on the next adjacent tooth 21.

Attached to the shaft 17, and therefore, to the handle 16 is a rotatable member or plate 23 which is similar to the plate 20. Mounted on the plate 23 by means of a fastener 24 is a pin 25 which in turn rotatably supports a projection or roller 26.

Figure 2:
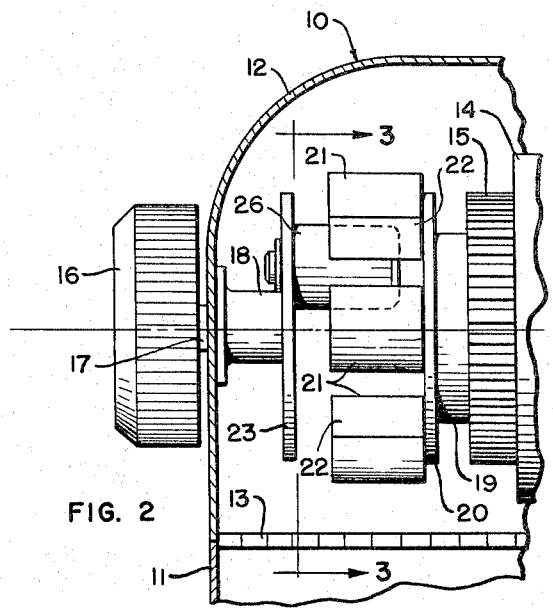
FIG. 2 is a partial front view of the device shown in FIG. 1 showing the coupling of the present invention in an engaged position.

The roller 26 is mounted on the plate 23 at a distance from the axes of the handle 16 and the shaft 17 which is equal to the distance of the axes of the teeth 21 from the axis of the platen 14. Therefore, as is best shown in FIG. 2, when the cover 12 is brought into its closed position, that is, into engagement with the base portion 11, and the axes of the handle 16 and the shaft 17 are aligned with the axis of the platen 14, the teeth 21 attached to the platen 14 and the roller 26 attached to the handle 16 are aligned with each other. Accordingly, if the roller 26 is positioned between any two flat surfaces 22 of two adjacent teeth 21, the roller 26 is in position to drive the platen 14 through the teeth 21 and the plate 20. The diameter of the roller 26 is purposely made identical to the distance between mating flat surfaces 22 of adjacent teeth 21. Therefore, the handle 16 drives the platen 14 in either direction without slippage whenever the cover is closed; that is, whenever the cover 12 is engaged with the base portion 11.

Figure 3:
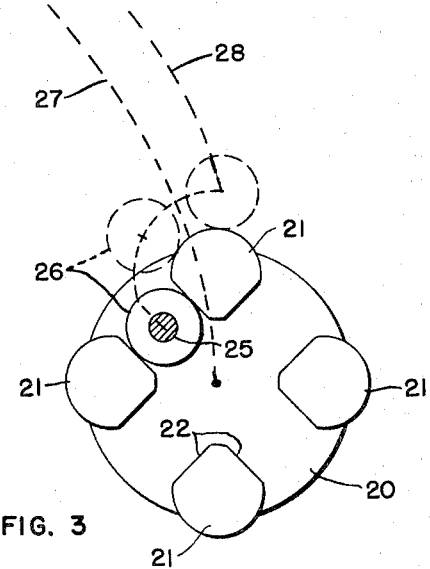
FIG. 3 is a partial sectional view taken along the line 3—3 in FIG. 2 in the direction of the arrows showing the path of travel of the components of the coupling of the present invention as they are moved from a disengaged to an engaged position.

Referring now to FIG. 3 the teeth 21 and the roller 26 are shown in an engaged position. Also shown are two dashed lines 27 and 28 which are the paths of travel of the axis of the handle 16 and the axis of the roller 26, respectively, as the cover 12 is moved from its position shown in FIG. 1 to its position shown in FIG. 2. As the dashed lines 27 and 28 indicate the axis of the handle 16 follows a circular path about the hinge 13 from a position of misalignment with the axis of the plate 14 into a position of alignment therewith. As is indicated by the path 28, however, the axis of the roller 26 frequently does not follow a circular path since the roller 26 comes into engagement with one of the teeth 21 as the cover 12 is closed.

Due to the rotatable mounting of both the roller 26 with respect to the plate 23 and the handle 16 with respect to the cover 12 the engagement of the roller 26 with one of the teeth 21 does not hinder the engagement or coupling action of the roller 26 with the teeth 21 in any manner whatsoever. Instead the roller 26 merely rotates about the pin 25 and the plate 23 rotates in the bearing 18 so that the roller 26 cams itself into engagement between the flat surfaces 22 of two adjacent teeth 21.

The flat surfaces 22 of the teeth 21 are provided to allow a large amount of tolerance in the axial alignment of the axes of the handle 16 and the platen 14 when the cover 12 is closed. Thus, as long as the roller 26 is engaged with any portion of the flat surfaces 22 of two adjacent teeth 21 any orbital movement of the roller 26 about the axis of the handle 16 forces the teeth 21 to move orbitally about the axis of the platen 14. In situations where precise axial alignment of the axis of the handle 16 with the axis of the platen 14 can be assured, the teeth 21 can be replaced with rollers similar to the roller 26.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A device for coupling a first shaft to a second shaft upon relative movement of the shafts from a position of misalignment of their axes to a position of alignment of their axes comprising:
   a plurality of projections mounted on a first of the shafts and having axes substantially parallel to the axis of the first shaft;
   a projection mounted on a second of the shafts for rotation about an axis extending substantially parallel to the axis of the second shaft and positioned for engagement with at least one of the plurality of projections on the first shaft to cause the first shaft and the second shaft to rotate together whenever they are in axial alignment one with the other; and
   means for permitting movement of the projection on the second shaft with respect to the projections on the first shaft as the shafts are brought from a position of axial misalignment to a position of substantial axial alignment and for thereby positioning the projection on the second shaft in engagement with at least one of the projections on the first shaft.

2. The coupling according to claim 1 wherein the means for permitting movement of the projection on the second shaft cams the projection on the second shaft into engagement with two of the projections on the first shaft when the first shaft and the second shaft are brought to a position of axial alignment.

3. A coupling according to claim 1 wherein the projection on the second shaft is spaced a first distance away from the axis of the second shaft and the projections on the first shaft are spaced said first distance away from the axis of the second shaft.

4. A coupling according to claim 1 wherein the projections on the first shaft are spaced about the axis of the first shaft in equal angular intervals.

5. A coupling including:
   a first rotatable member having an axis;
   driving means mounted on the first rotatable member at a predetermined distance from its axis for rotation therewith;
   a second rotatable member having an axis;
   driving means mounted on the second rotatable member at said predetermined distance from its axis for rotation therewith and for engagement with the driving means on the first rotatable member to couple the first rotatable member to the second rotatable member so that they rotate together;
   means for moving the first and the second rotatable members substantially radially with respect to each other into and out of axial alignment; and
   means for rotating the first rotatable member with respect to the second rotatable member as the first rotatable member is aligned with the second rotatable member to bring the driving means on the first rotatable member into engagement with the driving means on the second rotatable member.

6. The coupling according to claim 5 wherein the driving means on the second rotatable member is a plurality of equally spaced teeth having axes extending parallel to the axis of the second rotatable member mounted on the second rotatable member in a circle about the axis of the member the radius of which is equal to the predetermined distance.

7. The coupling according to claim 6 wherein the teeth on the second rotatable member are all of the same width, wherein there is a space of predetermined size between the outer surfaces of adjacent teeth and wherein the driving means on the first rotatable member is a roller having a diameter equal to the predetermined size of the space between adjacent teeth on the second rotatable member so that when the driving means on the second rotatable member is engaged with the driving means on the second rotatable member the rotatable members rotate one with the other in either direction without slip.

References Cited

UNITED STATES PATENTS

| 2,640,334 | 6/1953 | Spang | 64—6 X |
| 2,729,323 | 1/1956 | Jones | 197—145 |
| 2,823,527 | 2/1958 | Belden et al. | 64—9 |
| 2,867,101 | 1/1959 | Case | 64—9 |
| 2,909,046 | 10/1959 | Wheeler | 64—10 |

HALL C. COE, *Primary Examiner.*